United States Patent
Pachler et al.

(10) Patent No.: US 9,727,766 B2
(45) Date of Patent: Aug. 8, 2017

(54) CHIP CARD READING ARRANGEMENT

(71) Applicant: Infineon Technologies AG, Neubiberg (DE)

(72) Inventors: Walther Pachler, Graz (AT); Juergen Hoelzl, Graz (AT); Josef Gruber, St. Ruprecht an der Raab (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 15/042,158

(22) Filed: Feb. 12, 2016

(65) Prior Publication Data
US 2016/0239695 A1    Aug. 18, 2016

(30) Foreign Application Priority Data
Feb. 18, 2015   (DE) .................. 10 2015 102 288

(51) Int. Cl.
*G06K 7/08* (2006.01)
*G06K 7/10* (2006.01)
*G06K 19/077* (2006.01)
*G06K 19/07* (2006.01)
*H04B 5/00* (2006.01)

(52) U.S. Cl.
CPC ..... *G06K 7/10356* (2013.01); *G06K 7/10178* (2013.01); *G06K 7/10326* (2013.01); *G06K 19/07794* (2013.01); *G06K 7/10316* (2013.01); *G06K 7/10336* (2013.01); *G06K 19/0723* (2013.01); *H04B 5/0081* (2013.01)

(58) Field of Classification Search
CPC .... H01Q 1/2208; H01Q 1/2283; H01Q 21/29; G06K 19/07794; G06K 19/0723; G06K 7/10178; G06K 7/10326; G06K 7/10336; G06K 7/10356; G06K 7/10316; H04B 5/00; H04B 5/0081
USPC ........................................ 235/451
See application file for complete search history.

(56) References Cited

U.S. PATENT DOCUMENTS 6,010,016 A * 1/2000 Siegal .................... A21C 9/083
                                                    198/803.11
6,839,035 B1 * 1/2005 Addonisio ......... G06K 7/10178
                                                    340/572.1
(Continued)

FOREIGN PATENT DOCUMENTS

EP          2405054 B1      2/2013

*Primary Examiner* — Claude J Brown
(74) *Attorney, Agent, or Firm* — Viering, Jentschura & Partner mbB

(57) ABSTRACT

A chip card reading arrangement is provided including a chip card reading device including a data processing circuit and a reader antenna coupled to the data processing circuit arranged at a surface of the chip card reading device for placing a chip card to communicate with the chip card reading device via the reader antenna. The data processing circuit is configured to process at least one of signals received via the reader antenna and signals to be transmitted via the reader antenna. The chip card reading arrangement further includes an antenna structure including an antenna body, a first antenna and a second antenna coupled to the first antenna and surrounded by the first antenna. The antenna structure is arranged on and fixed to the surface of the chip card reading device such that the reader antenna surrounds the second antenna.

21 Claims, 14 Drawing Sheets

(56) References Cited

U.S. PATENT DOCUMENTS

| | | | | |
|---|---|---|---|---|
| 2007/0146138 | A1* | 6/2007 | Phipps | G06K 7/0008 340/572.7 |
| 2007/0222604 | A1* | 9/2007 | Phipps | G06K 7/0008 340/572.7 |
| 2007/0229279 | A1* | 10/2007 | Yamazaki | G06K 19/0701 340/572.7 |
| 2009/0033467 | A1* | 2/2009 | Finocchiaro | H04B 5/00 340/10.1 |
| 2010/0214176 | A1* | 8/2010 | Fixter | G06K 7/0008 343/700 R |
| 2012/0306714 | A1* | 12/2012 | Yosui | H01Q 1/2208 343/788 |
| 2012/0326842 | A1* | 12/2012 | Grinberg | G06K 7/10178 340/10.1 |
| 2014/0184462 | A1* | 7/2014 | Yosui | H01Q 7/06 343/788 |
| 2015/0021402 | A1* | 1/2015 | Finn | G06K 19/07794 235/492 |
| 2015/0261985 | A1* | 9/2015 | Ramsch | G06K 7/10336 235/439 |
| 2015/0269477 | A1* | 9/2015 | Finn | G06K 19/07794 235/492 |
| 2015/0356334 | A1* | 12/2015 | Leutgeb | H01Q 21/30 235/439 |

* cited by examiner

CHIP CARD READING ARRANGEMENT

CROSS-REFERENCE TO RELATED APPLICATION

This application claims priority to German Patent Application Serial No. 10 2015 102 288.5, which was filed Feb. 18, 2015, and is incorporated herein by reference in its entirety.

TECHNICAL FIELD

The present disclosure relates to chip card reading arrangements.

BACKGROUND

Chip cards come in various formats such as ID-1 and ID-2 but may also include much smaller transponders such as RFID (radio-frequency identification) transponders. Accordingly, there are large variations in the size of the antennas between different chip cards and a reading device suited for a certain antenna size may have a poor communication performance for another, e.g. much smaller, antenna size. Therefore, it may be desirable to adapt a reader designed for a certain antenna size to a different, e.g. much smaller, antenna size.

SUMMARY

A chip card reading arrangement is provided including a chip card reading device including a data processing circuit and a reader antenna coupled to the data processing circuit arranged at a surface of the chip card reading device for placing a chip card to communicate with the chip card reading device via the reader antenna. The data processing circuit is configured to process at least one of signals received via the reader antenna and signals to be transmitted via the reader antenna. The chip card reading arrangement further includes an antenna structure including an antenna body, a first antenna and a second antenna coupled to the first antenna and surrounded by the first antenna. The antenna structure is arranged on and fixed to the surface of the chip card reading device such that the reader antenna surrounds the second antenna.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
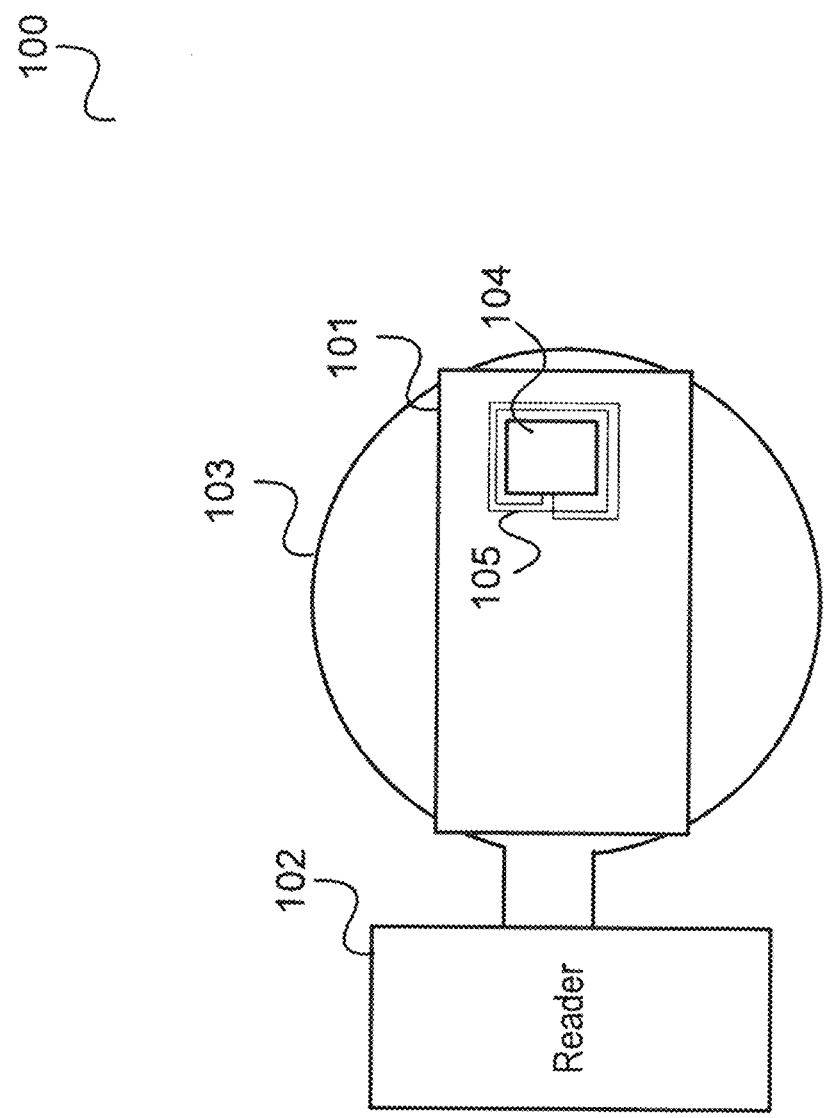
FIG. 1 shows a communication arrangement including a reader device (or reader) and a chip card.

FIG. 1 shows a communication arrangement 100 including a reader device 102 (or reader) and a chip card 101. The reader includes an antenna 103 which is for example arranged in a housing onto which the chip card 101 is placed, i.e. around the detection area. The reader antenna 103 may be round (as shown) or rectangular and may for example have a diameter (or width) of 5 cm to 15 cm.

The chip card 101 includes a chip card module 104 and an antenna 105 to communicate with the reader device 102 via the reader antenna 103.

The antenna 103 of the reader device 102 is for example a large sized PCD antenna that is suited to the particular application. Transport readers for instance, are designed to operate with ID1 and ID2 cards and provide good communication performance with cards of these dimensions. The dimensions of these ID1, ID2 etc. cards are several cm and can be found in the ISO/IEC 7810. However, such a reader is not designed to operate in combination with small RFID (radio-frequency identification) transponders. Therefore, the performance of the communication with small scaled transponders is poor. In some cases, a well performing reader is able to communicate with a small transponder but only at corner positions of the reader PCD. Thus, it may not be possible to ensure a successful communication at the overall antenna area of the reader antenna 103. In other words, due to the limited coupling factor between the antenna of the reader (also referred to as PCD for proximity coupling device) and the antenna of the chip card (also referred to as PICC for proximity integrated circuit card) the reader devices may be blind at its center position and not able to communicate with a small transponder, i.e. with a chip card with small antenna, e.g. of an RFID transponder.

For example, active modulation at 13.56 MHz enables the possibility to combine the RFID technology into small scaled devices, such as a µSD cards, but it may then not be possible to communicate with readers with large PCD antennas (e.g. larger than 10×10 cm) in centered position.

Figure 2:
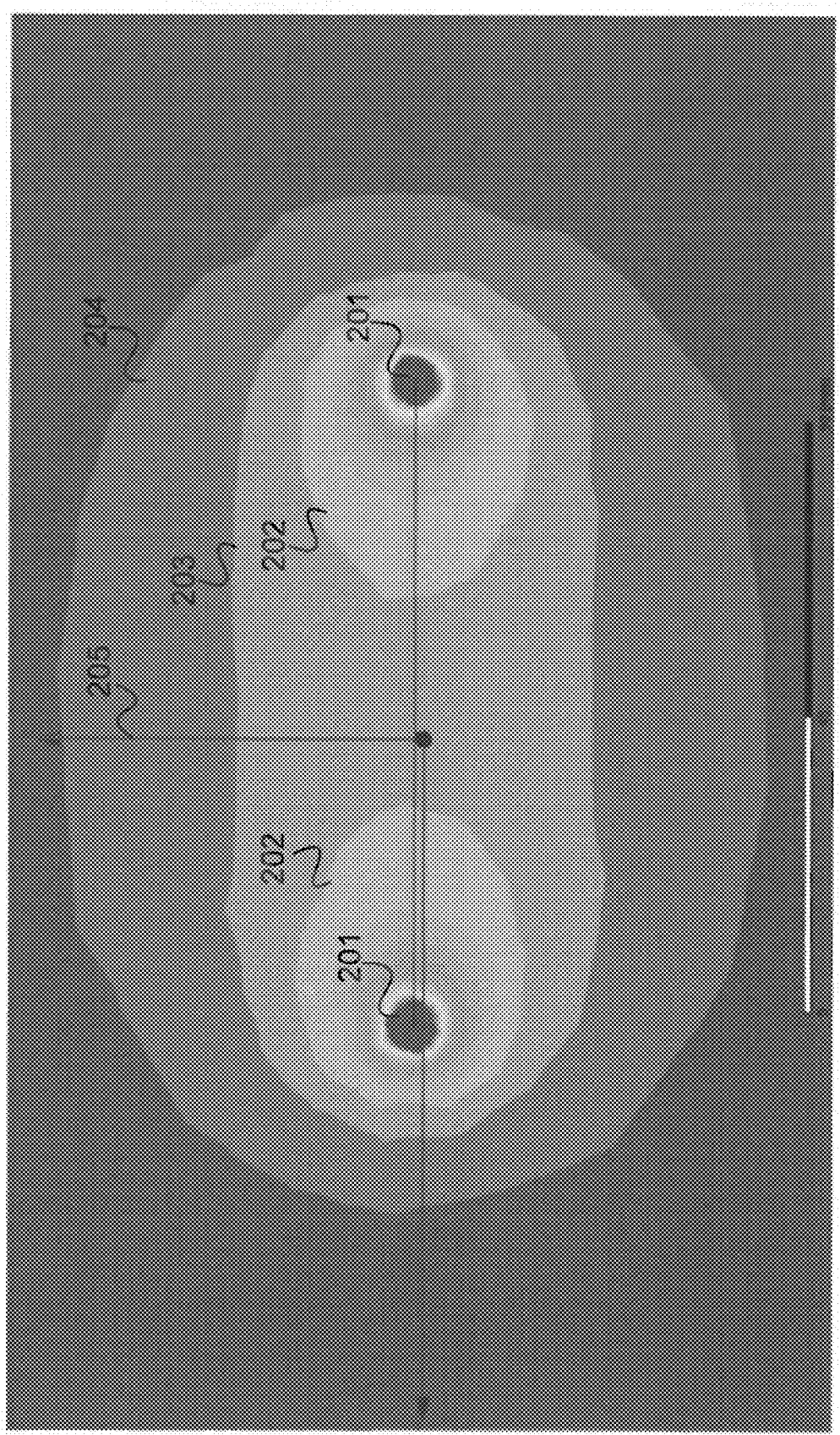
FIG. 2 illustrates the magnetic field distribution of a cross section of an antenna of a reader as illustrated in FIG. 1.

FIG. 2 illustrates the magnetic field distribution of a cross section of an antenna of a reader as illustrated in FIG. 1.

First areas 201 (also referred to as hot-spots) with high magnetic field strength are formed around the wires forming the antenna. Second areas 202 around the antenna wires with lower magnetic field strength than the first areas 201 may for example still provide sufficient magnetic field strength to ensure a radio communication. However, a third area 203 with lower magnetic field strength than the second area 202 and a fourth area 204 with even lower magnetic field strength may for example not provide sufficient magnetic field strength for a radio communication such that for example a chip card with a small antenna arranged at a center axis 205 may not successfully communicate with the reader.

Figure 3:
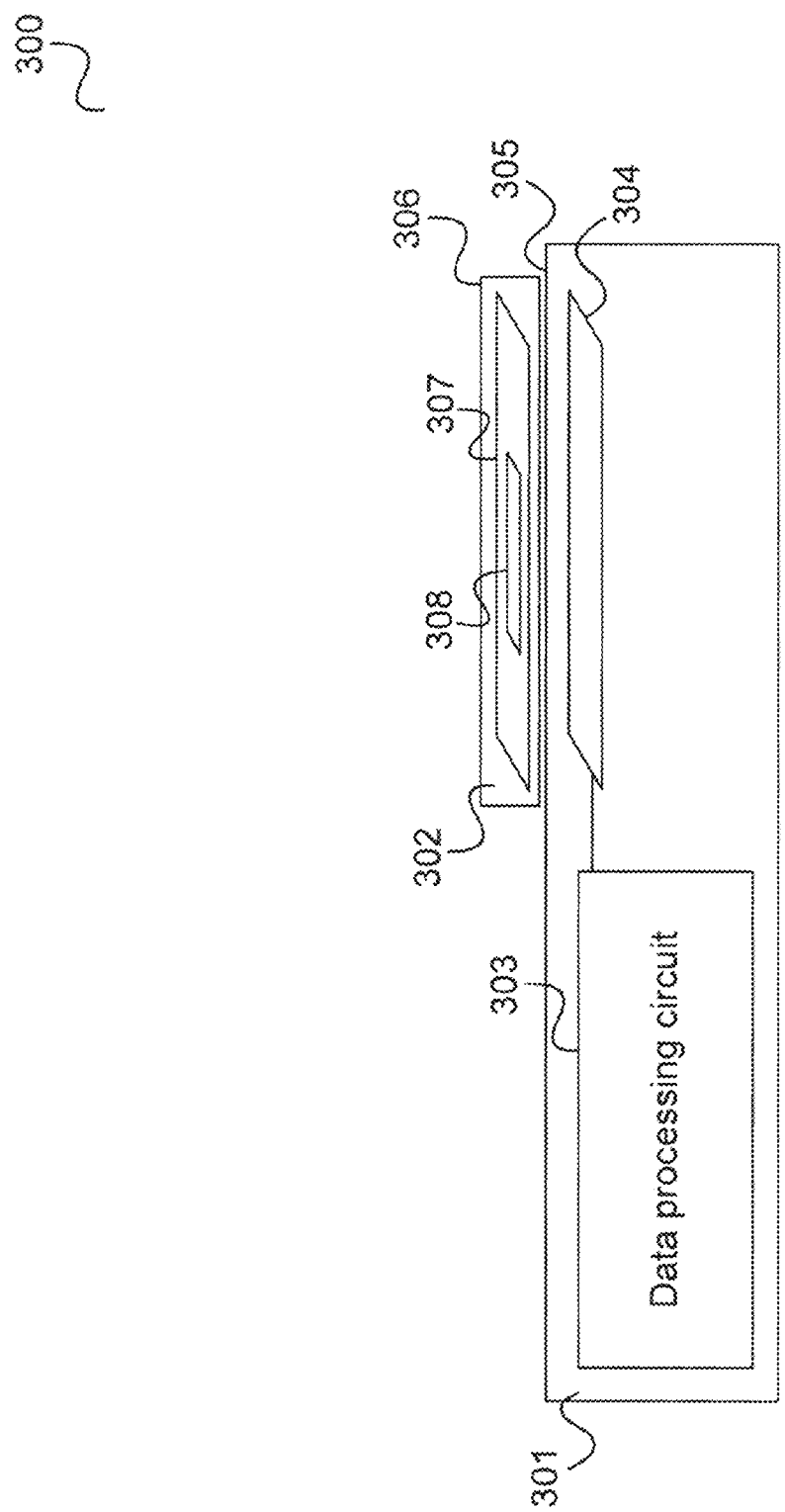
FIG. 3 shows a chip card reading arrangement according to an embodiment.

This issue may for example be addressed by a reading device as illustrated in FIG. 3.

FIG. 3 shows a chip card reading arrangement 300 according to an embodiment.

The chip card reading arrangement 300 includes a chip card reading device 301 and an antenna structure 302.

The chip card reading device 301 includes a data processing circuit 303 and a reader antenna 304 coupled to the data processing circuit arranged at a surface 305 of the chip card reading device for placing a chip card to communicate with the chip card reading device 301 via the reader antenna 304. The data processing circuit 303 is configured to process at least one of signals received via the reader antenna 304 and signals to be transmitted via the reader antenna 304.

The antenna structure includes an antenna body 306, a first antenna 307 and a second antenna 308 coupled to the first antenna 307 and surrounded by the first antenna 307.

The antenna structure 302 is arranged on and fixed to the surface 305 of the chip card reading device 301 such that the reader antenna 304 surrounds the second antenna 308.

In other words, a chip card reader is provided with an antenna structure (also referred to as antenna upgrade in the following) which includes at least one inner antenna that lies within the area surrounded by an outer antenna of the antenna structure as well as the area surrounded by the reader antenna. Illustratively, the inner antenna may act as a concentrator the magnetic field emitted by the reader antenna to a smaller area. The antenna structure can be seen as booster antenna structure which is arranged on reader instead of within a chip card.

It should be noted that the reader antenna and the second antenna may lie in different planes when the antenna structure is placed above the surface at which the reader antenna is located. Also the first antenna and the second antenna do not necessarily lie within the same plane (but may for example be part of different layers of the body of the antenna structure). Accordingly, the reader antenna or first antenna, respectively, surrounding the second antenna may be understood as the reader antenna/first antenna surrounding the second antenna when shifted to the same plane (e.g. perpendicular to the surface of the chip card reading device and/or the axis of the reader antenna or the second antenna. The shifting distance is small with respect to the diameter of the reader antenna or the first antenna, respectively, e.g. less than 5% or 10% than the diameter). The reader antenna surrounding the second antenna may also be understood as the second antenna lying in a detection area of the chip card reading device defined by the reading antenna.

For example, an antenna structure is provided which can be applied directly onto the detection area of a standard RFID reader. It includes a large pickup coil (i.e. an outer antenna with a similar dimension as reader antenna) and one (or more) smaller coupling structures (i.e. inner antennas). Due to the antenna form, the magnetic field is focused to a hotspot (small coupling structure) that is for example arranged in the center of the detection area surrounded by the reader antenna.

It should be noted that the second antenna does not necessarily have to be surrounded by the first antenna and the reader antenna but is for example surrounded by only one or none of them. The second antenna is for example placed near the first antenna and/or the reader antenna and may but may or may not be surrounded by them. In this case, there may for example be a marking on the surface of antenna body of the antenna structure indicating a position near the second antenna to be a position where a small transponder, e.g. of the RFID form factor, should be placed. For example, an area of a surface of the antenna body below which the second antenna is arranged may be marked in this way.

Accordingly, according to one embodiment, a chip card reading arrangement is provided including a chip card reading device including a data processing circuit and a reader antenna coupled to the data processing circuit arranged at a surface of the chip card reading device for placing a chip card to communicate with the chip card reading device via the reader antenna, wherein the data processing circuit is configured to process at least one of signals received via the reader antenna and signals to be transmitted via the reader antenna and an antenna structure including an antenna body, a first antenna and a second antenna coupled to the first antenna and smaller than the first antenna and the reader antenna.

According to one embodiment, the chip card reading device further includes a housing wherein the surface of the chip card reading device is a surface of the housing.

According to one embodiment, the antenna body includes a substrate, e.g. a printed circuit board.

According to one embodiment, the antenna body includes a housing of the antenna structure.

The housing (of the antenna structure) is for example, arranged on and fixed to the surface of the chip card reading device.

According to one embodiment, the antenna structure is fixed to the surface of the chip card reading device by fastening means, e.g. including at least one of one or more screws or one or more nut and bolt arrangements.

According to one embodiment, the antenna structure is fixed to the surface of the chip card reading device by an adhesive.

According to one embodiment, the first antenna includes one or more first windings and the second antenna includes one or more second windings lying within the one or more first windings.

According to one embodiment, the reader antenna includes one or more reader antenna windings and the second antenna includes one or more second windings and the antenna structure is arranged on and fixed to the surface of the chip card reading device such that the one or more second windings lie within the one or more reader antenna windings.

According to one embodiment, the antenna structure includes a plurality of second antennas coupled to the first antenna and surrounded by the first antenna and the antenna structure is arranged on and fixed to the surface of the chip card reading device such that the reader antenna surrounds the second antennas.

The antenna structure is for example configured to concentrate magnetic power emitted by the reader antenna.

For example, the antenna structure is configured to concentrate magnetic power emitted by the reader antenna to a central area of the antenna structure (e.g. corresponding to the second antenna).

According to one embodiment, the antenna structure is configured such that the first antenna receives power from the reader antenna and provides the received power to the second antenna and the second antenna emits the received power in form of magnetic power.

According to one embodiment, the antenna structure is arranged on and fixed to the surface of the chip card reading device such that the first antenna lies above the reader antenna.

The first antenna and the reader antenna may have substantially the same size.

According to one embodiment, the first antenna is for example larger than the second antenna.

According to one embodiment, the antenna structure includes a surface for placing a chip card to communicate with the chip card reading device to communicate with the chip card reading device via the first antenna, the second antenna and the reader antenna.

According to one embodiment, the first antenna is configured to forward signals to be transmitted by the chip card reading device (e.g. to a chip card) to the second antenna and is configured to forward signals to be received by the chip card reading device (e.g. from a chip card) to the reader antenna.

In the following, embodiments are described in more detail.

Figure 4:
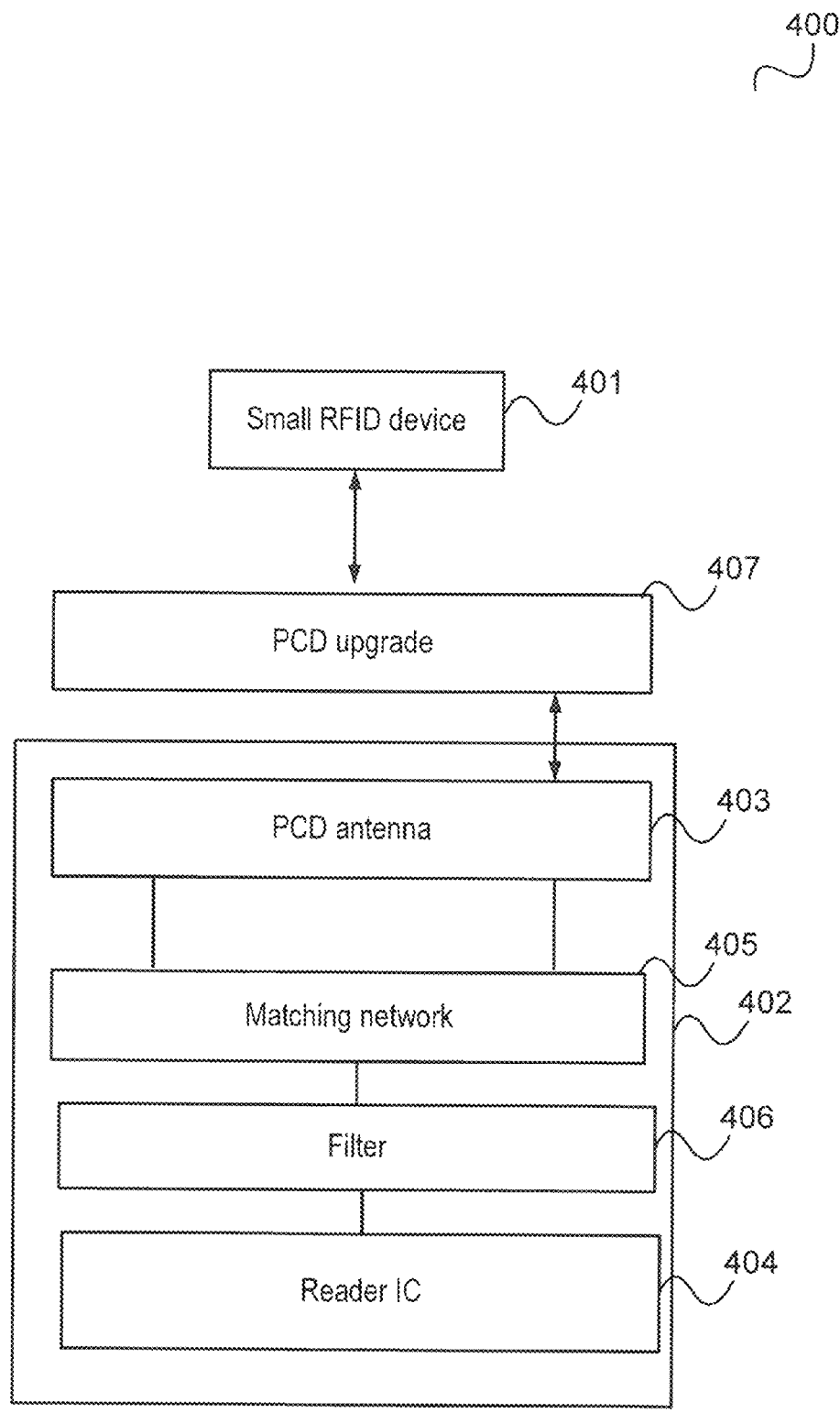
FIG. 4 shows a communication arrangement according to an embodiment.

FIG. 4 shows a communication arrangement 400 according to an embodiment.

Similarly to the communication arrangement 100 of FIG. 1, the communication arrangement 400 includes a reader device 402 (or reader) and a chip card 401. The reader device 402 includes an antenna 403 (also referred to as PCD antenna). The antenna 403 is galvanically coupled to a reader IC (integrated circuit) 404 via a matching network 405 and a filter 406.

In this example, the chip card 401 is a small RFID device which may for example not be able to communicate via the PCD antenna 403 with the reading device 402 if it is placed near a center of the PCD antenna 403. However, a PCD upgrade 407 is arranged over the PCD antenna 403, e.g. over a detection area or detection surface of the reader 402 defined by the PCD antenna. The PCD upgrade 407, also generally referred to as antenna structure, has a high (magnetic) coupling coefficient with the PCD antenna 403 and is formed such that it concentrates the magnetic field of the PCD antenna 403 to a smaller area than the detection area such that the communication between the chip card 401 and the reader 402 via the PCD upgrade 407 and the PCD antenna 403 is possible.

The PCD upgrade 407 is fixed to the reader 402. For example, the PCD upgrade 407 includes a carrier (e.g. a printed circuit board) and/or a housing which is fixed to a surface, e.g. of a housing, of the reader 402, e.g. fixed by an adhesive or fixed with mechanical fastening means (also referred to as a "fastener") such as screws etc., to adapt the reader 402 to the usage with smaller-sized antennas than its PCD antenna 403.

Figure 5:
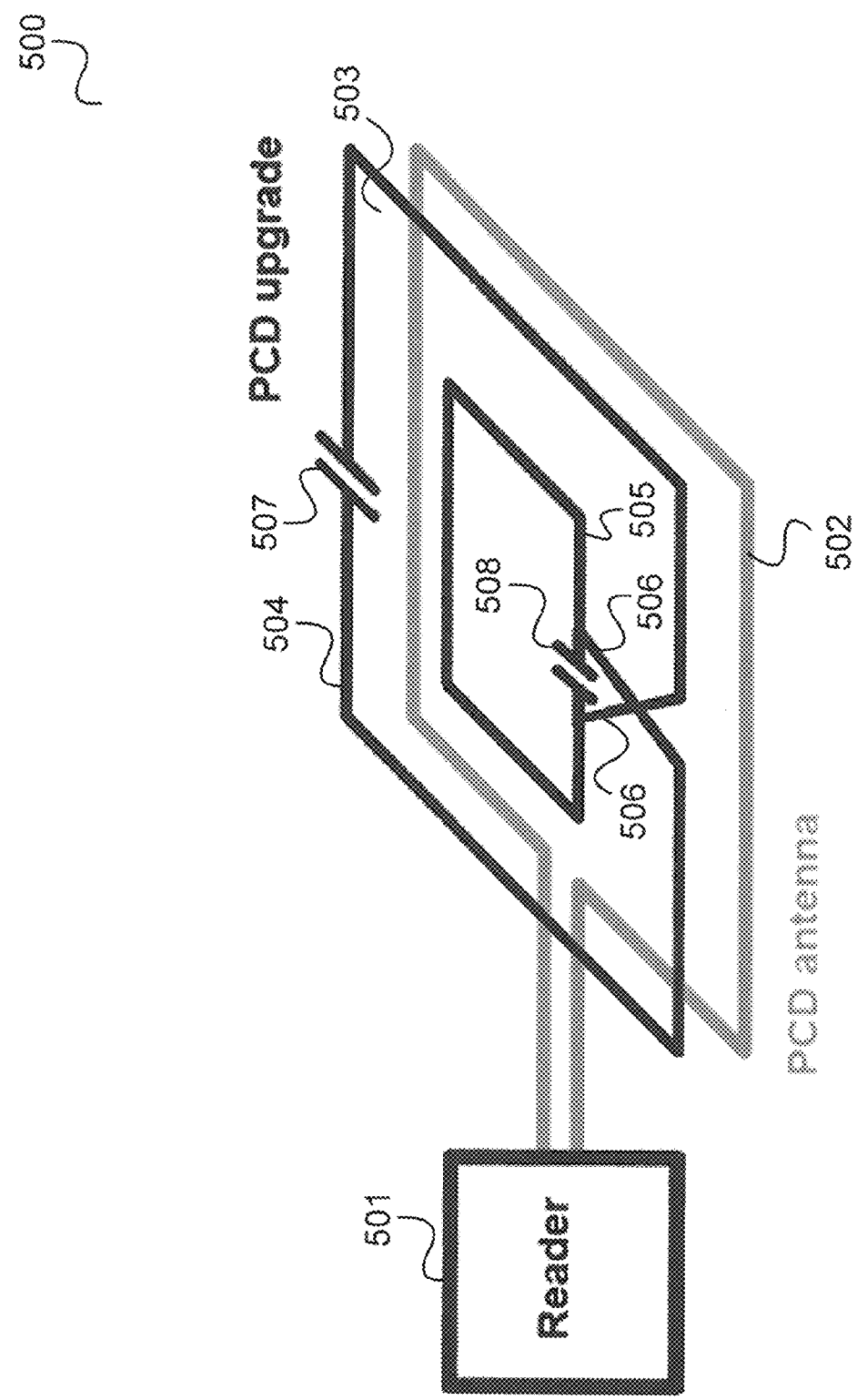
FIG. 5 shows a chip card reader arrangement.

The PCD upgrade 407 for example has the form as illustrated in FIG. 5.

FIG. 5 shows a chip card reader arrangement 500.

The chip card reader arrangement 500 includes a reader 501 including a PCD antenna 502. Over the PCD antenna 502, a PCD upgrade 503 is arranged. The PCD upgrade 503 includes an outer (larger) antenna 504 (also referred to as pickup coil) and a smaller (inner) antenna 505 (also referred to as coupling structure) which are galvanically coupled to each other by wires 506. In this example, each of the antennas 504, 505 is formed by one winding with a respective capacitor 507, 508 coupled in between each winding but each antenna can include a plurality of windings. The inner antenna 505 can be seen to form a coupling structure for magnetically coupling with a chip card having a small antenna (i.e. of a dimension significantly smaller than the PCD antenna 502).

The antenna structure, i.e. the PCD upgrade 503, can be tuned in a way that focuses the total power into the coupling structure. Therefore, a communication with a small scaled transponder is feasible, in this case however only at the center position of the PCD upgrade 503.

Figure 6:
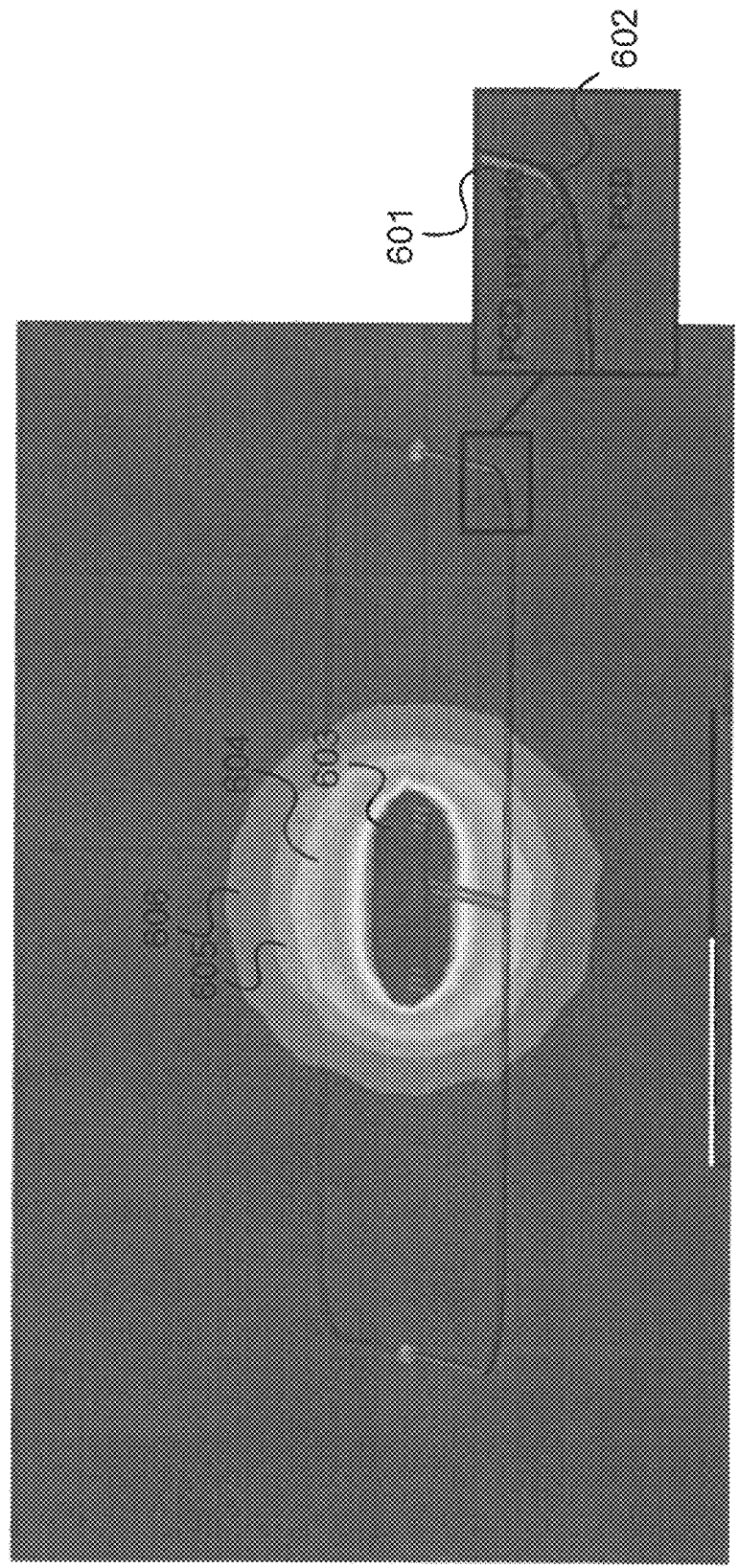
FIG. 6 shows illustrates the magnetic field distribution of a cross section of an arrangement of a PCD upgrade placed on a PCD antenna.

FIG. 6 illustrates the magnetic field distribution of a cross section of an arrangement of a PCD upgrade 601 placed on a PCD antenna 602, e.g. corresponding to the PCD upgrade 504 and the PCD antenna 502. In this example, the outer antenna and the inner antenna of the PCD upgrade 601 each have a plurality of windings.

As can be seen, the PCD upgrade 601 forces the total power into the coupling structure, i.e. into a central area indicated by areas 603, 604, 605, 606 of (when going farther away from the center) decreasing magnetic field strength.

To allow communication with a small scaled chip cards, e.g. including RFID tags, which are not necessarily arranged at the center of the PCD upgrade and PCD antenna, the antenna structure (i.e. the PCD upgrade) may be tuned in a way to split the available power to different locations, such that the coupling structure (inner antenna) does not propagate the maximum of available power.

Basically, both antenna resonant circuits can be matched individually. Which matching is finally chosen depends on the application. Thus, the field strength distribution can be adjusted for the given operating volume. The matching is done by selecting an appropriate capacitor value (e.g. of capacitors 507, 508) depending on both inductances of the PCD upgrade structure.

Figure 7:
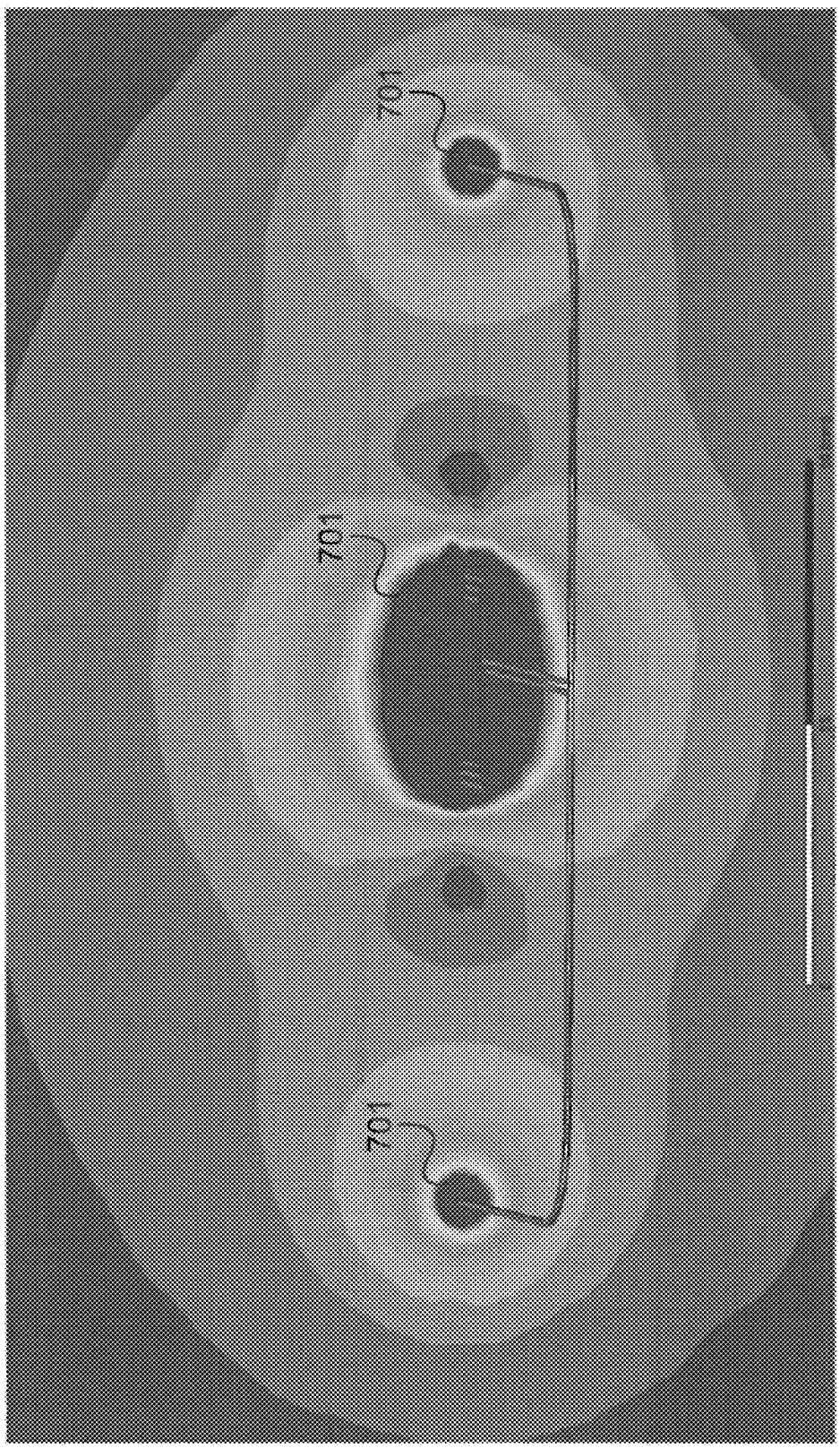
FIG. 7 illustrates the magnetic field distribution of a cross section of an arrangement of a PCD upgrade placed on a PCD antenna which is tuned such that the magnetic power is distributed over various locations.

The splitting of available power is illustrated in FIG. 7.

FIG. 7 illustrates the magnetic field distribution of a cross section of an arrangement of a PCD upgrade placed on a PCD antenna which is tuned such that the magnetic power is distributed over various locations.

The resulting magnetic field strength distribution can be seen as a combination of the magnetic field strength distributions of FIG. 2 and FIG. 6, i.e. hot-spots 701 are formed in the center of the PCD upgrade as well as around the wires of the outer antenna (including areas of decreased magnetic field strength when leaving these hot-spots as described with reference to FIG. 2 and FIG. 6).

This configuration allows ID1 cards as well as small scaled RFID transponders to communicate with the reader device. Moreover miniaturized transponders can be detected at the overall spanned PCD area, i.e. the detection area as defined (i.e. surrounded) by the PCD antenna.

In a similar way as illustrated in FIG. 7, a higher number of hot-spots (e.g. more than one center hot-spot) can be implemented. By splitting the available power to several hot spots a large detection area can be generated.

Various examples of the PCD upgrade 407 are illustrated in FIG. 8 to FIG. 11.

Figure 8:
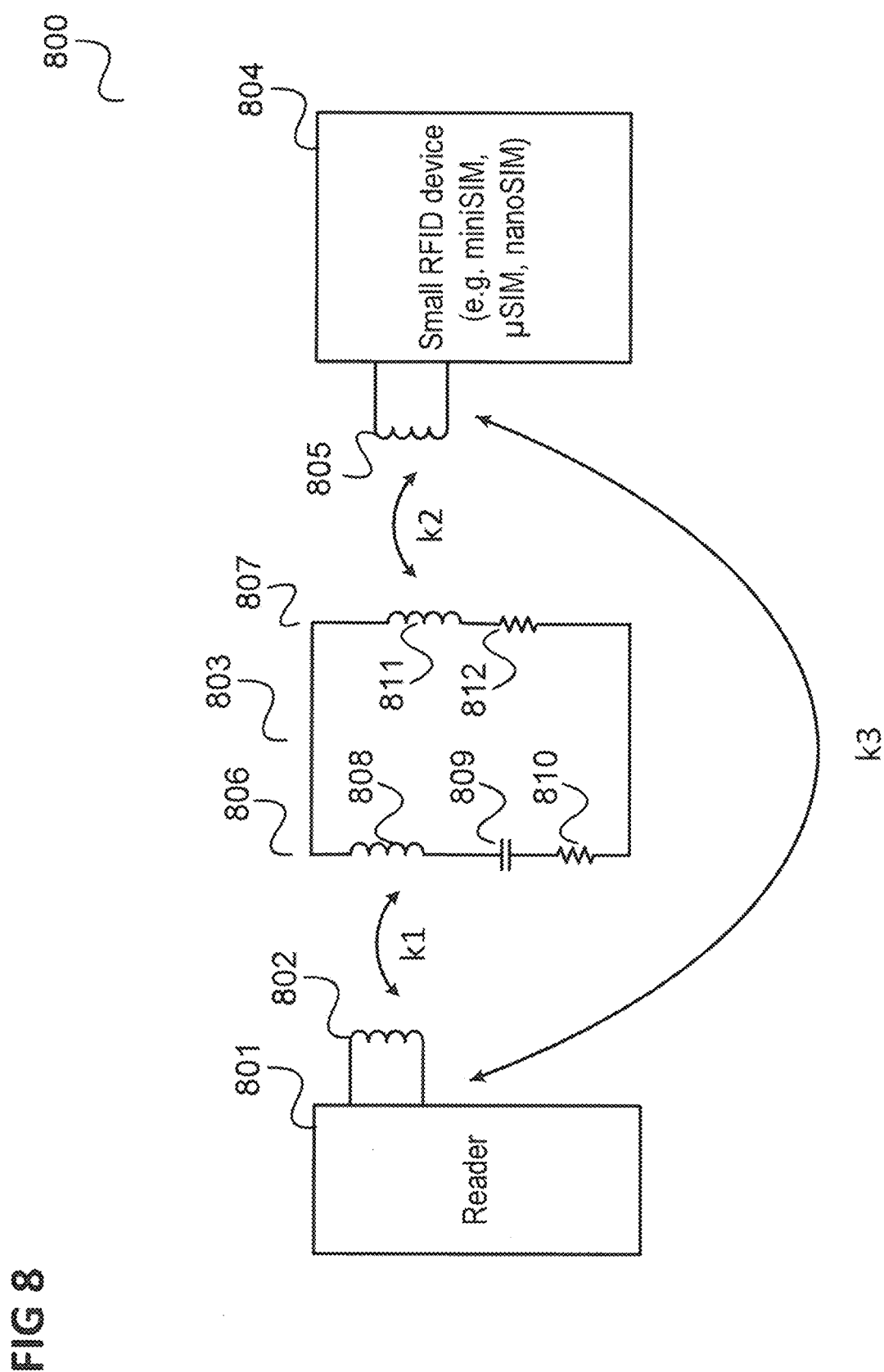
FIG. 8 shows a communication arrangement according to an embodiment.

FIG. 8 shows a communication arrangement 800. Similarly to the communication arrangement 400, the communication arrangement 800 includes a reader 801 having a PCD antenna 802, a PCD upgrade 803 and a chip card 804 with a small antenna 805, e.g. an RFID device.

Similarly to the PCD upgrade 504 of FIG. 5, the PCD upgrade 803 includes an outer antenna 806 and an inner antenna 807 which are coupled to each other (connected in parallel). The outer antenna 806 corresponds to a serial connection of a first inductance 808, a capacitor 809 and a first resistor 810. The inner antenna 807 corresponds to a serial connection of a second inductance 811 and a second resistor 812. The PCD antenna 802 and the outer antenna 808 are coupled with a coupling factor k1 and the inner antenna 807 and the antenna 805 of the chip card 804 are coupled with a coupling factor k2.

The PCD antenna 802 and the antenna 805 of the chip card 804 are coupled with a coupling factor k3. The coupling factor k3 is much smaller than k2 and k1. This results from the fact that the PCD antenna 802 is much larger than the RFID device 804 while the inner antenna 807 and the antenna 805 of the chip card 804 are geometrically matched.

Figure 9:
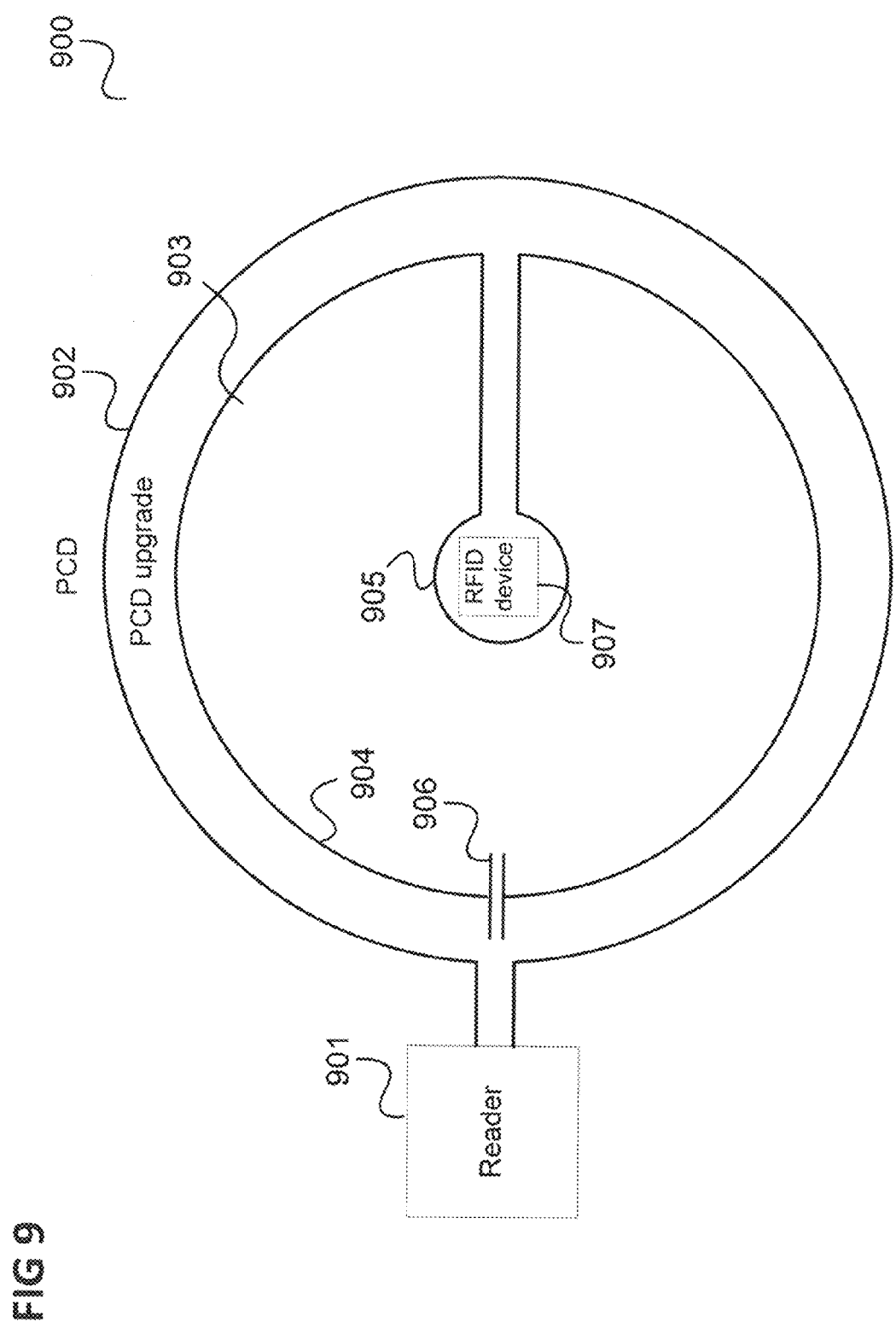
FIG. 9 shows a different view of the communication arrangement of FIG. 8.

FIG. 9 shows communication arrangement 900, which is a different view of the communication arrangement 800.

In FIG. 9, a reader 901 corresponds to the reader 801, a PCD antenna 902 corresponds to the reader antenna 802, a PCD upgrade 903 corresponds to the PCD upgrade 803 and an RFID device 907 corresponds to the chip card 804. The PCD upgrade 903 includes an outer antenna 904 corresponding to the outer antenna 806 which includes a capacitor 906 corresponding to the capacitor 809 and an inner antenna 905 corresponding to the inner antenna 807.

Figure 10:
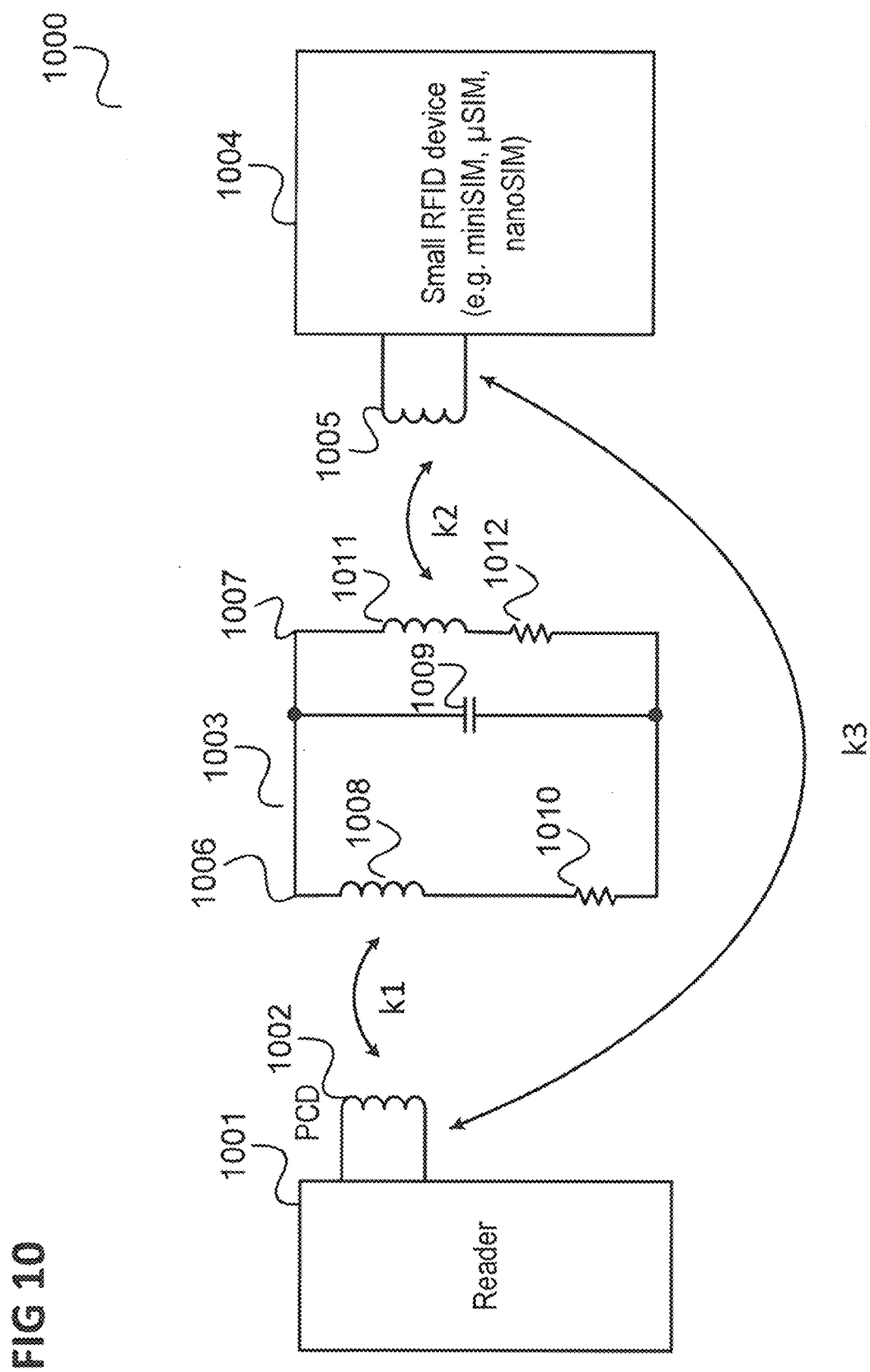
FIG. 10 shows a communication arrangement according to a further embodiment.

FIG. 10 shows a communication arrangement 1000. Similarly to the communication arrangement 400, the communication arrangement 1000 includes a reader 1001 having a PCD antenna 1002, a PCD upgrade 1003 and a chip card 1004 with a small antenna 1005, e.g. an RFID device.

Similarly to the PCD upgrade 504 of FIG. 5, the PCD upgrade 1003 includes an outer antenna 1006 and an inner antenna 1007 which are coupled to each other (connected in parallel). The outer antenna 1006 corresponds to a serial connection of a first inductance 1008 and a first resistor 1010. The inner antenna 1007 corresponds to a serial connection of a second inductance 1011 and a second resistor 1012. Further, a capacitor 1009 is connected in parallel to the outer antenna 1006 and the inner antenna 1007. The PCD antenna 1002 and the outer antenna 1008 are coupled with a coupling factor k1 and the inner antenna 1007 and the antenna 1005 of the chip card 1004 are coupled with a coupling factor k2. The PCD antenna 1002 and the antenna 1005 of the chip card 1004 are coupled with a coupling factor k3 smaller than the coupling factors k1 and k2.

Figure 11:
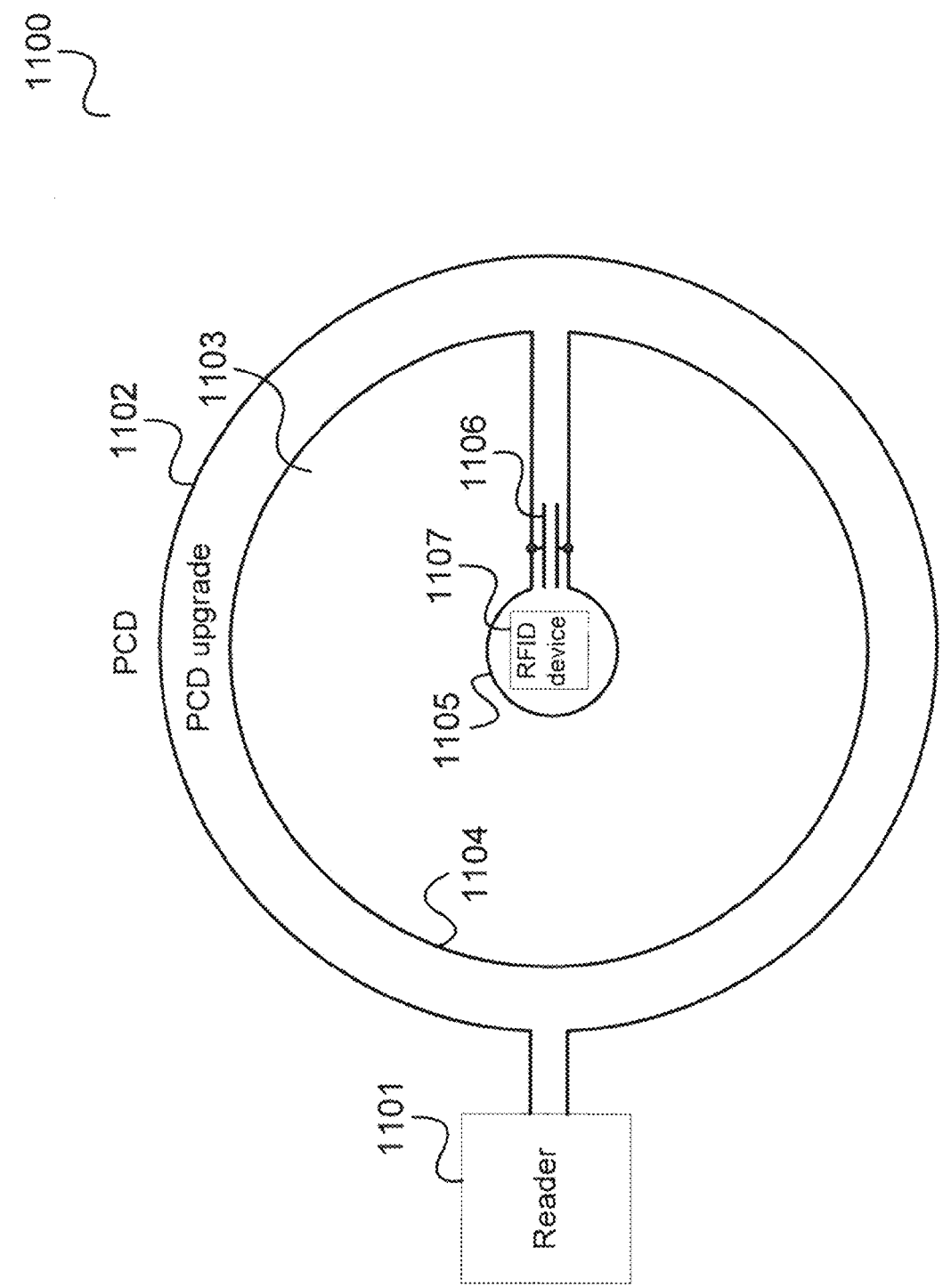
FIG. 11 shows a different view of the communication arrangement of FIG. 10.

FIG. 11 shows communication arrangement 1100, which is a different view of the communication arrangement 1000.

In FIG. 11, a reader 1101 corresponds to the reader 1001, a PCD antenna 1102 corresponds to the reader antenna 1002, a PCD upgrade 1103 corresponds to the PCD upgrade 1003 and an RFID device 1107 corresponds to the chip card 1004. The PCD upgrade 1103 includes an outer antenna 1104 corresponding to the outer antenna 1006, an inner antenna 1105 corresponding to the inner antenna 1007 and a capacitor 1106 corresponding to the capacitor 1009.

Figure 12:
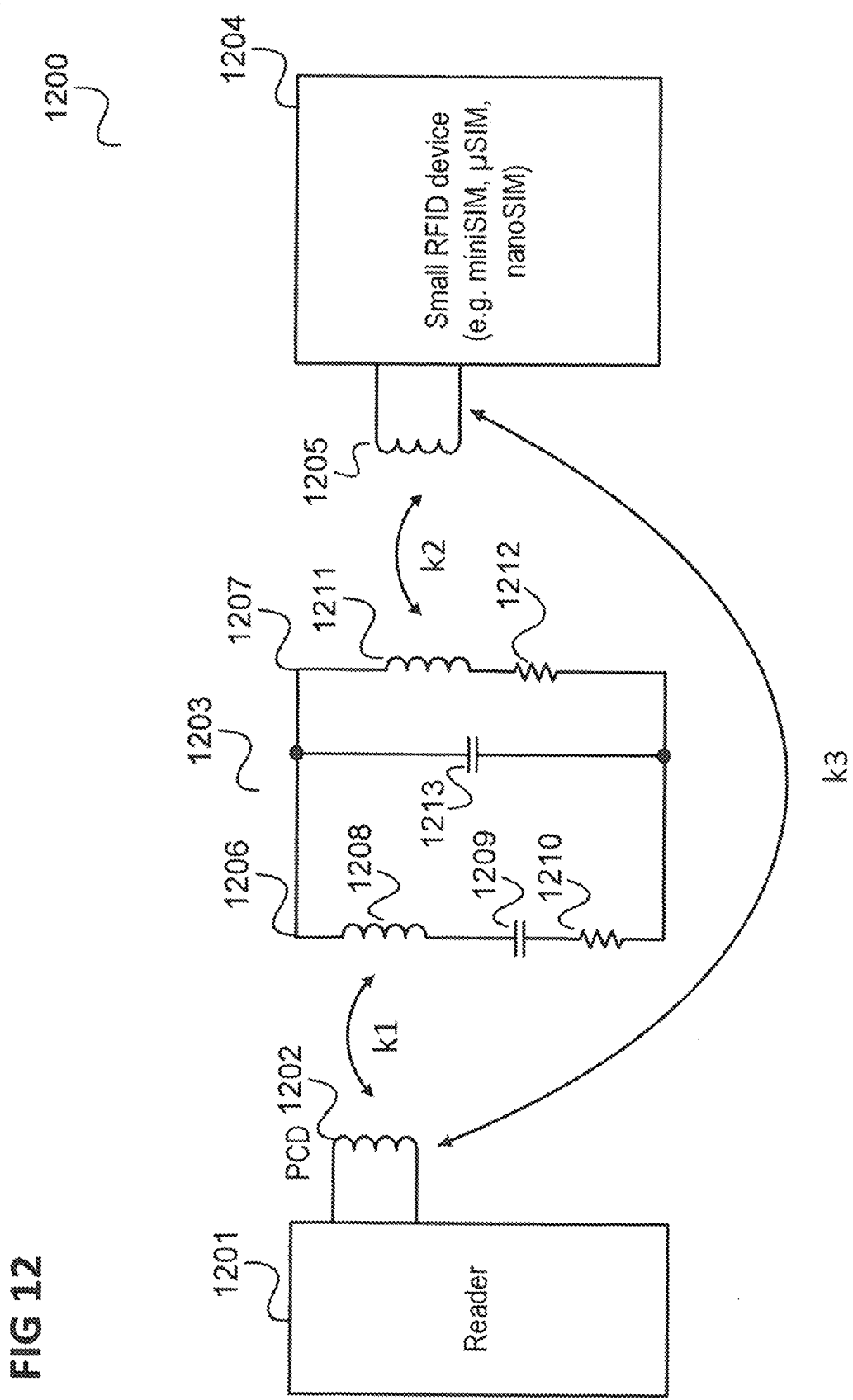
FIG. 12 shows a communication arrangement according to a further embodiment.

FIG. 12 shows a communication arrangement 1200. Similarly to the communication arrangement 400, the communication arrangement 1200 includes a reader 1201 having a PCD antenna 1202, a PCD upgrade 1203 and a chip card 1204 with a small antenna 1205, e.g. an RFID device.

Similarly to the PCD upgrade 504 of FIG. 5, the PCD upgrade 1203 includes an outer antenna 1206 and an inner antenna 1207 which are coupled to each other (namely connected in parallel). The outer antenna 1206 corresponds to a serial connection of a first inductance 1208 and a first resistor 1210 and includes a first capacitor 1209. The inner antenna 1207 corresponds to a serial connection of a second inductance 1211 and a second resistor 1212. Further, a capacitor 1213 is connected in parallel to the outer antenna 1206 and the inner antenna 1207. The PCD antenna 1202 and the outer antenna 1208 are coupled with a coupling factor k1 and the inner antenna 1207 and the antenna 1205 of the chip card 1204 are coupled with a coupling factor k2. The PCD antenna 1202 and the antenna 1205 of the chip card 1204 are coupled with a coupling factor k3 smaller than the coupling factors k1 and k2.

Figure 13:
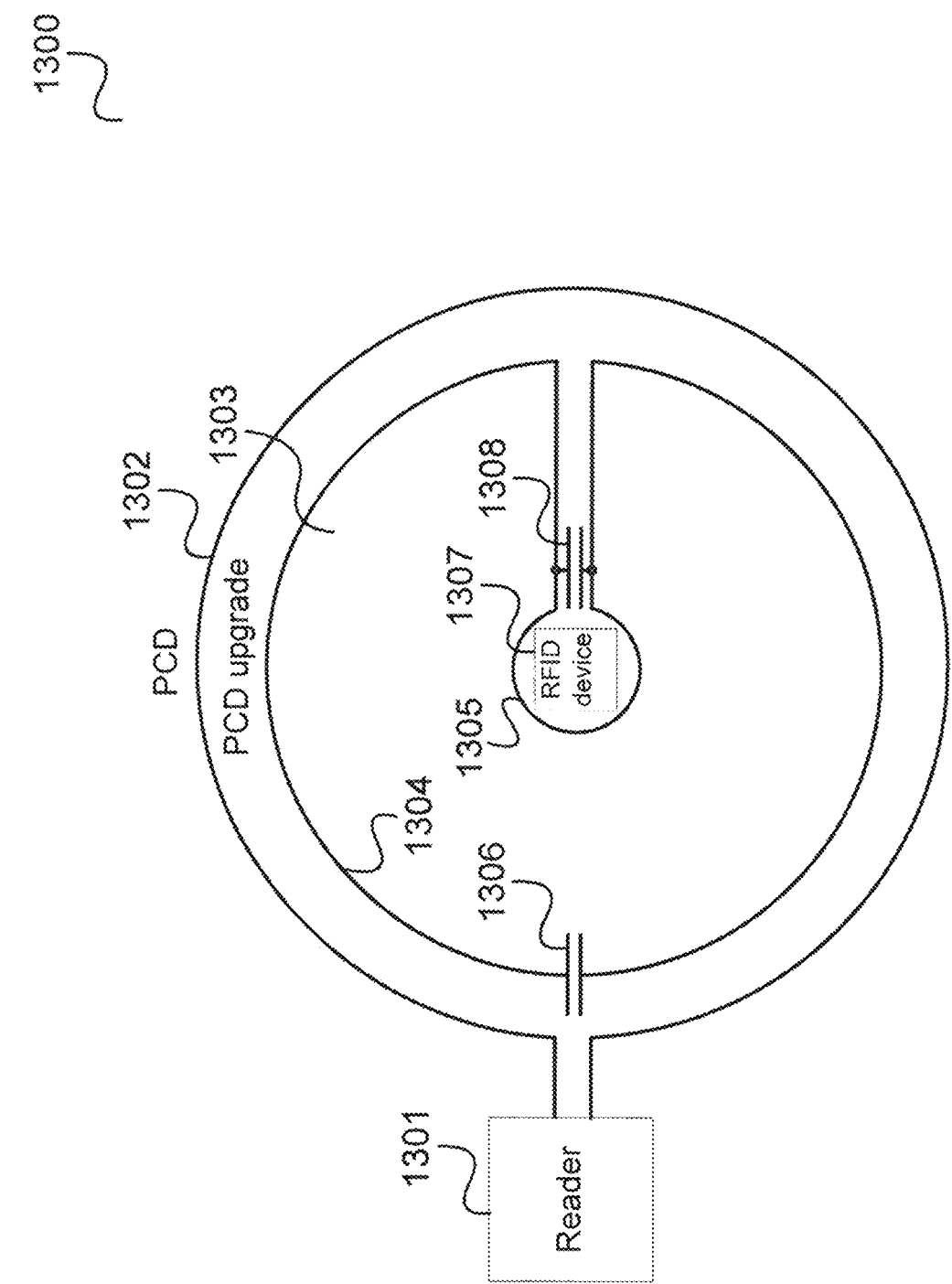
FIG. 13 shows a different view of the communication arrangement of FIG. 12.

FIG. 13 shows a different view of the communication arrangement 1200.

In FIG. 13, a reader 1301 corresponds to the reader 1201, a PCD antenna 1302 corresponds to the reader antenna 1202, a PCD upgrade 1303 corresponds to the PCD upgrade 1203 and an RFID device 1307 corresponds to the chip card 1204. The PCD upgrade 1303 includes an outer antenna 1304 corresponding to the outer antenna 1206, an inner antenna 1305 corresponding to the inner antenna 1207, a first capacitor 1306 corresponding to the first capacitor 1209 and a second capacitor 1308 corresponding to the second capacitor 1213.

Figure 14:
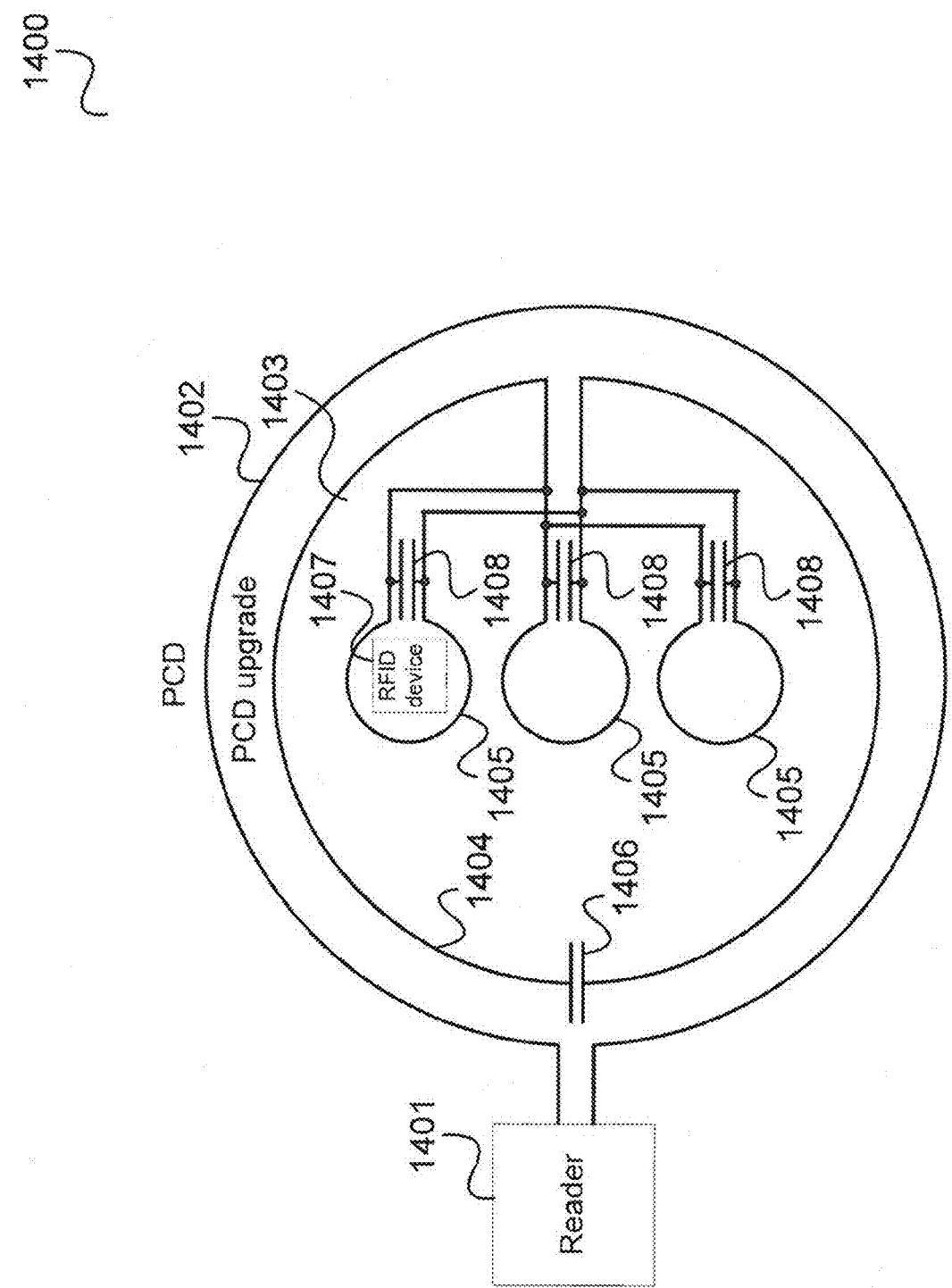
FIG. 14 shows an example of a communication arrangement in which the PCD upgrade has a plurality of inner antennas.

FIG. 14 shows an example of a communication arrangement 1400 in which the PCD upgrade has a plurality of inner antennas, such that a plurality of hotspots are formed.

Similarly to the communication arrangement 1300 of FIG. 13, the communication arrangement 1400 includes a reader 1401, a PCD antenna 1402, a PCD upgrade 1403 and an RFID device 1407. As the PCD upgrade 1303, the PCD upgrade 1403 includes an outer antenna 1404 including a first capacitor 1406. However, in this example, the PCD upgrade 1403 includes a plurality of inner antennas 1405 connected to the outer antenna 1404. For each inner antenna 1405, the PCD upgrade 1403 includes a second capacitor 1408 similarly to the second capacitor 1308. The RFID device 1407 is in this example arranged over the topmost inner antenna in FIG. 14.

In the following, results of experiments for validation of the functionality of the PCG upgrade are given. The experiments are based on a setup in which the reader antenna upgrade (implemented on a printed circuit board) is directly arranged at the top of the reader antenna (also implemented on a printed circuit board and connected via cable and e.g. a balun with the other reader components; the reader antenna is in this example a 50 Ohm matched antenna). The chip card is in this example a µSIM (e.g. arranged within a mobile phone), i.e. communication is to be performed between the reader and the µSIM transponder. It can be seen that without reader antenna upgrade the µSIM transponder has to be arranged close to the PCD antenna for allowing communication and a communication is not possible when the µSIM is arranged at a center position of the PCD antenna.

In following the results of a measurement of the reading distance to the µSIM transponder as well as the reading distance to ID1 cards from the reader antenna are given.

Center Measurement:

Reading distance measurement with ID1 and µSIMon custom built 50 Ohm reader antenna. In this measurement the position of the chip card is centered.

ID1 centered without PCD upgrade: 4 cm

ID1 centered with PCD upgrade: 5.1 cm

μSIM centered without PCD upgrade: FAIL
μSIM centered with PCD upgrade: 1.7 cm
Corner Measurement:
Reading distance measurement with ID1 and μSIMon custom built 50 Ohm reader antenna. In this measurement the position of the chip card is arranged at a corner of the PCD antenna.
μSIM without PCD upgrade: 1.2 cm
μSIM with PCD upgrade: 1.2 cm
Thus, the usage of PCD upgrade has no draw back compared to the usage of the reader without PCD upgrade with regard to communication at a corner position.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A chip card reading arrangement, comprising
 a chip card reading device comprising
  a data processing circuit; and
  a reader antenna coupled to the data processing circuit arranged at a surface of the chip card reading device for placing a chip card to communicate with the chip card reading device via the reader antenna, wherein the data processing circuit is configured to process at least one of signals received via the reader antenna and signals to be transmitted via the reader antenna; and
 an antenna structure comprising
  an antenna body,
  a first antenna and
  a second antenna coupled to the first antenna and surrounded by the first antenna;
  wherein the antenna structure is arranged on and fixed to the surface of the chip card reading device such that the reader antenna surrounds the second antenna.

2. The chip card reading arrangement of claim 1, wherein the chip card reading device further comprises a housing wherein the surface of the chip card reading device is a surface of the housing.

3. The chip card reading arrangement of claim 1, wherein the antenna body comprises a substrate.

4. The chip card reading arrangement of claim 1, wherein the antenna body comprises a printed circuit board.

5. The chip card reading arrangement of claim 1, wherein the antenna body comprises a housing of the antenna structure.

6. The chip card reading arrangement of claim 5, wherein the housing is arranged on and fixed to the surface of the chip card reading device.

7. The chip card reading arrangement of claim 1, wherein the antenna structure is fixed to the surface of the chip card reading device by a fastener.

8. The chip card reading arrangement of claim 1, wherein the antenna structure is fixed to the surface of the chip card reading device by an adhesive.

9. The chip card reading arrangement of claim 1, wherein the first antenna comprises one or more first windings and the second antenna comprises one or more second windings lying within the one or more first windings.

10. The chip card reading arrangement of claim 1, wherein the reader antenna comprises one or more reader antenna windings and the second antenna comprises one or more second windings and the antenna structure is arranged on and fixed to the surface of the chip card reading device such that the one or more second windings lie within the one or more reader antenna windings.

11. The chip card reading arrangement of claim 1, wherein the antenna structure comprises a plurality of second antennas coupled to the first antenna and surrounded by the first antenna and
wherein the antenna structure is arranged on and fixed to the surface of the chip card reading device such that the reader antenna surrounds the second antennas.

12. The chip card reading arrangement of claim 1, wherein the antenna structure is configured to concentrate magnetic power emitted by the reader antenna.

13. The chip card reading arrangement of claim 1, wherein the antenna structure is configured to concentrate magnetic power emitted by the reader antenna to a central area of the antenna structure.

14. The chip card reading arrangement of claim 1, wherein the antenna structure is configured such that the first antenna receives power from the reader antenna and provides the received power to the second antenna and the second antenna emits the received power in form of magnetic power.

15. The chip card reading arrangement of claim 1, wherein the antenna structure is arranged on and fixed to the surface of the chip card reading device such that the first antenna lies above the reader antenna.

16. The chip card reading arrangement of claim 1, wherein the first antenna and the reader antenna have substantially the same size.

17. The chip card reading arrangement of claim 1, wherein the first antenna is larger than the second antenna.

18. The chip card reading arrangement of claim 1, wherein the antenna structure comprises a surface for placing a chip card to communicate with the chip card reading device via the first antenna, the second antenna and the reader antenna.

19. The chip card reading arrangement of claim 1, wherein the first antenna is configured to forward signals to be transmitted by the chip card reading device to the second antenna and is configured to forward signals to be received by the chip card reading device to the reader antenna.

20. A chip card reading arrangement comprising
 a chip card reading device comprising
  a data processing circuit; and
  a reader antenna coupled to the data processing circuit arranged at a surface of the chip card reading device for placing a chip card to communicate with the chip card reading device via the reader antenna,
  wherein the data processing circuit is configured to process at least one of signals received via the reader antenna and signals to be transmitted via the reader antenna; and
 an antenna structure comprising
  an antenna body,
  a first antenna and a plurality of second antennas coupled to the first antenna, each of the plurality of second antennas being smaller in area than the first antenna and the reader antenna, wherein the antenna structure is arranged on and fixed to the surface of the chip card reading device.

21. The chip card reading arrangement of claim 20, wherein each of the plurality of second antennas is surrounded by the first antenna.

* * * * *